Nov. 29, 1955 W. F. BORN ET AL 2,725,541
BUS DUCT CURRENT DISTRIBUTION APPARATUS
Filed July 30, 1951
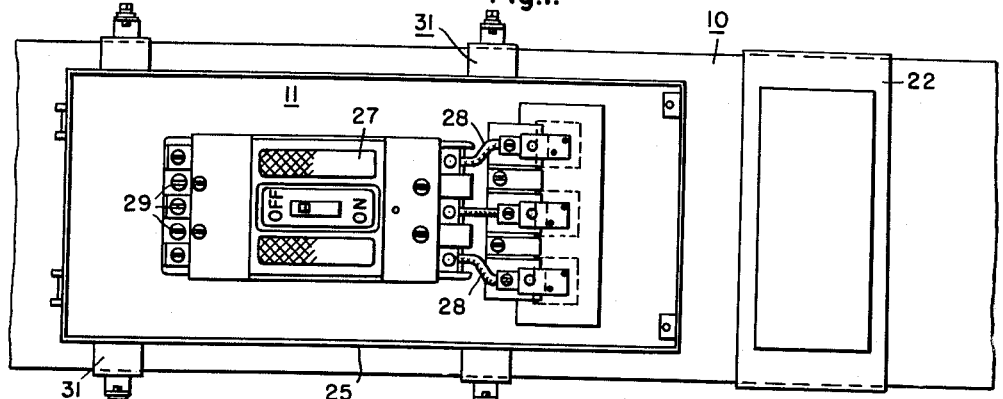
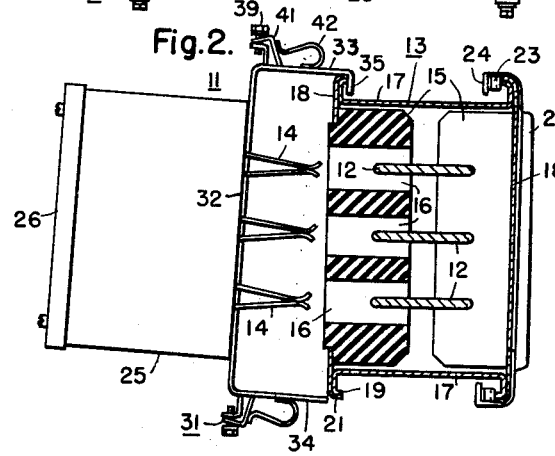
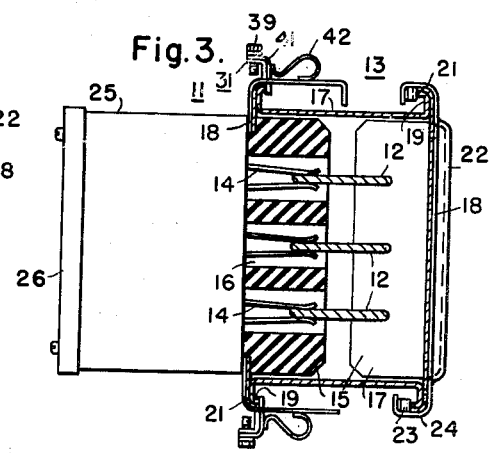
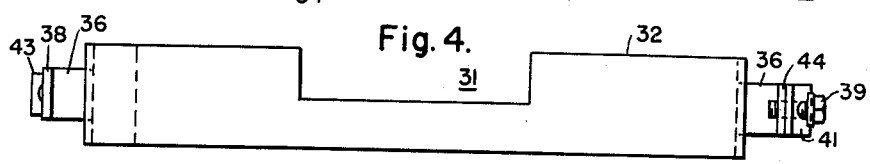
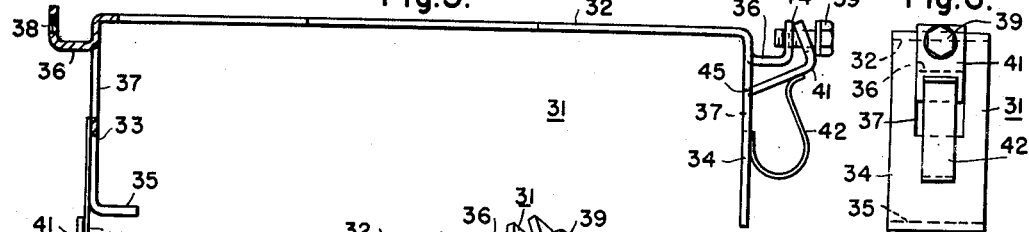
WITNESSES:
E. A. McCloskey
Geo. L. Groome
INVENTORS
William F. Born
and John Zipay.
BY T. R. Chilcott
ATTORNEY

# United States Patent Office 2,725,541
Patented Nov. 29, 1955

2,725,541

BUS DUCT CURRENT DISTRIBUTION APPARATUS

William F. Born, Beaver, and John Zipay, New Brighton, Pa., assignors to Westinghouse Electric Corporation, East Pittsburgh, Pa., a corporation of Pennsylvania Application July 30, 1951, Serial No. 239,242

8 Claims. (Cl. 339—22)

Our invention relates, generally, to current distribution apparatus and, more particularly, to apparatus of the type commonly known as bus duct in which rigid bus bars are enclosed in a generally rectangular metal housing having spaced openings therein for the attachment of current take-off devices, known as plug-in units, at desired locations.

It is the usual practice to provide the plug-in units for bus duct with contact members or stabs which engage the bus bars inside of the bus duct housing when the plug-in unit is installed in the operating position on the housing. Since it is usually necessary for an electrician to work from a ladder when installing a plug-in unit, it is desirable to simplify the installation procedure.

An object of our invention, generally stated, is to provide current distribution apparatus which shall be efficient in operation and which may be economically manufactured and easily installed.

Another object of our invention is to provide for hanging a plug-in unit on the duct housing prior to its final installation on the housing.

A further object of our invention is to provide a spring-biased clamp for holding a plug-in unit in its operating position on the bus duct housing.

Still another object of our invention is to provide a combined clamp and guide member for a bus duct plug-in unit.

A still further object of our invention is to provide a clamp and guide member which may be utilized on plug-in units of different sizes.

Other objects of our invention will be explained fully hereinafter or will be apparent to those skilled in the art.

In accordance with one embodiment of our invention, a generally U-shaped member is so secured to a plug-in unit that the legs of the U function as guides when the unit is being installed on a bus duct housing. One leg is bent to form a hook for hanging the unit on the housing prior to its installation. A clamp is attached to each leg by a spring which biases the clamp to its open position until a screw is turned to draw the clamp closed, thereby holding the plug-in unit in its operating position on the duct housing.

For a better understanding of the nature and objects of our invention, reference may be had to the following detailed description, taken in conjunction with the accompanying drawing, in which:

Figure 1 is a view, in side elevation, of a portion of a bus duct housing and a plug-in unit embodying the principal features of our invention, the cover for the plug-in unit being removed;

Fig. 2 is a view, partly in end elevation and partly in section, of the bus duct structure with the plug-in unit hanging on the duct housing prior to the final installation of the plug-in unit;

Fig. 3 is a view, similar to Fig. 2 with the plug-in unit secured in its operating position on the duct housing;

Fig. 4 is an enlarged view, in plan, of one of the combined guide and clamp members for the plug-in unit;

Fig. 5 is an enlarged view, partly in side elevation and partly in section, of the guide and clamp member;

Fig. 6 is an enlarged view, in end elevation, of the guide and clamp member; and Fig. 7 is an enlarged view, in perspective, of the clamp.

Referring to the drawing and particularly to Figs. 1, 2 and 3, the structure shown therein comprises a bus duct 10 and a plug-in unit 11 which is disposed on one side of the bus duct 10. The bus duct 10 is of the plug-in type having a plurality of bus bars 12 which are so disposed within a metal housing 13 that they may be engaged by contact members or stab connectors 14 which extend from the bottom of the plug-in unit 11. The bus bars 12 are supported by suitable insulators 15 which are located at regular intervals along the bus duct. In the present structure, the insulators 15 are provided with openings 16 for receiving the stab connectors 14.

As shown most clearly in Figs. 2 and 3, the housing 13 comprises generally channel shaped top and bottom walls 17 and side walls 18. The top and bottom walls 17 have inwardly extending flanges 19 which are overlapped by flanges 21 on the side walls 18. The side walls 18 are provided with openings for the insulators 15. A cover plate 22 is provided for each opening in the side walls 18. The cover plates 22 are slidably mounted on the housing 13 and may be retained in position by leaf springs 23 which are disposed between flanges 24 on the cover plate 22 and the edges of the flanges 19 and 21 on the housing 13.

The plug-in unit 11 comprises a metal casing 25 having a removable or openable cover 26. A circuit interrupter unit 27, which may be either an automatic circuit breaker or a manually operable switch, is mounted inside the casing 25 and is electrically connected to the stab connectors 14 by conductors 28, thereby connecting the interrupter unit to the bus bars 12 when the plug-in unit 11 is properly installed on the bus duct housing 13.

It will be understood that power conductors (not shown) may be connected to terminals 29 on the interrupter unit 27 to supply power for operating electric apparatus. In this manner the plug-in units may be located at the most advantageous positions along the bus duct for supplying power to the various machines or other apparatus in a factory. It will also be understood that the size of the interrupter unit 27, and hence the size of the plug-in unit 11, will depend upon the amount of power required for operating the particular machine or machines connected to the plug-in unit.

In order that the plug-in unit 11 may be easily and properly installed on the bus duct housing 13, it is desirable to provide guide members on the casing 25 for each plug-in unit to insure that the stab connectors 14 will properly engage the bus bars 12 when the casing 25 is placed on the bus duct housing 13. Furthermore, it is necessary to provide some means for retaining the plug-in unit in its connected position on the bus duct housing once it has been installed.

In order to simplify the structure of the apparatus and to facilitate its installation, we have provided a combined guide and clamping device 31 which is shown most clearly in Figs. 4, 5, 6 and 7. As shown, the device 31 comprises a generally U-shaped strap 32 having legs 33 and 34. An inwardly extending projection or hook 35 is provided on the one leg 33. An outwardly extending projection 36 is provided on each of the legs 33 and 34. The projection 36 may be formed by pressing a portion of each leg outwardly and bending it to the shape shown in Fig. 5. In this manner an opening 37 may be provided in each of the legs 33 and 34. A tapped hole 38 is provided in the upwardly extending portion of each projection 36 and a screw or bolt 39 is threaded into each opening 38.

An L-shaped clamp 41 is attached to each of the legs 33 and 34. As shown, the clamp 41 is supported by a flat spring member 42 having one end spot welded to a leg of the strap 32 and the other end spot welded to the clamp 41 near the bend in the clamp. An opening 43 is provided in the short leg of the L-shaped clamp 41 for the bolt 39.

As shown most clearly in Figs. 5 and 7, the spring 42, which is initially straight, may be bent in such a manner that the long leg of the L-shaped clamp 41 may be inserted into the opening 37 in the leg of the strap 32 and the bolt 39 inserted through the opening 43 into the opening 38 in the projection 36. As shown in Fig. 5 the one corner of the short leg of the L-shaped clamp 41 engages the projection 36 at a point 44 which functions as a pivot point for the clamp 41. The spring 42 biases the clamp 41 outwardly against the head of the bolt 39. When the bolt 39 is tightened against the clamp 41, the end 45 of the clamp 41 is drawn inwardly against the force of the spring 42.

As shown in Fig. 1, preferably at least two of the guide members 31 are attached to each plug-in unit 11. The strap 32 may be bolted or welded to the bottom of the casing 25 with the legs 33 and 34 extending substantially parallel to the stab connectors 14. It will be noted that the legs 33 and 34 are slightly longer than the stab connectors 14, thereby protecting the stab connectors from damage and also guiding the plug-in unit onto the housing 13 when it is being installed on the housing.

As explained hereinbefore, the bus duct in a factory is usually so located that it is necessary for the electrician to stand upon a ladder when installing a plug-in unit on the bus duct housing. Heretofore, when installing plug-in units, particularly the larger sizes, which are relatively heavy, it has been necessary for the electrician to climb up the ladder, remove the cover 22 from the desired opening in the housing 13, return down the ladder and then take the plug-in unit up the ladder and proceed with the installation of the unit on the bus duct housing.

With the present apparatus the electrician can carry the plug-in unit 11 up the ladder and hang it on a flange of the housing 13 by means of the hooks 35 at any place along the housing while he is removing the cover 22 from the desired opening in the housing. The cover 22 may be removed by merely prying outwardly on the cover and compressing the spring 23 to permit the cover to pass over the insulator 15 and then sliding the cover along the housing sufficiently to permit the installation of the plug-in unit. The plug-in unit 11 may then be slid along the housing until the stab connectors 14 are in alignment with the openings 16 in the insulator 15 after which the unit is pushed toward the housing 13 to cause the stab connectors 14 to engage the bus bars 12.

As shown in Fig. 3, the clamps 41 may then be drawn inwardly by tightening the bolts 39 to cause the clamps to engage the flanges on the housing 13, thereby retaining the plug-in unit in its connected position on the housing. As shown in Fig. 2, the springs 42 bias the clamps 41 outwardly while the plug-in unit is hanging on the housing prior to its final installation, thereby preventing the clamps from interfering with the installation of the plug-in unit.

In prior constructions it has been necessary for the electrician to endeavor to hold the clamps out of the way as well as to support the weight of the plug-in unit while installing the unit. Therefore, it is quite evident that the present structure greatly facilitates the installation of a plug-in unit, thereby reducing the time required for making the installation and reducing the cost of installing the unit.

From the foregoing description it is apparent that we have provided a combined guide and clamping device which is of a simple construction and which facilitates the installation of plug-in units on bus duct housings. The device is so constructed that the plug-in unit may be hung at any position along the duct prior to its being plugged in on the duct and then may be finally installed by merely sliding it along the duct housing to the proper location without it being necessary for the person making the installation to support the entire weight of the plug-in unit. The spring biased clamps are prevented from interfering with the installation, and they may be quickly tightened against the housing to retain the plug-in unit in its connected position.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a bus duct structure, in combination, a generally rectangular housing having a longitudinally extending portion thereon and an opening in at least one side, bus bars disposed inside the housing, a plug-in unit having stab connectors engageable with and disengageable from the bus bars through the opening, a support member secured to the unit, a hook portion on the support member slidably engaging the longitudinally extending portion on the housing with the stab connectors disengaged from the bus bars, said support member then supporting the unit on the housing for movement therealong adjacent said opening to a position where the unit is in proper position on the housing for the stab connectors to enter the opening and engage the bus bars, and securing means on said support member in addition to said hook portion, said securing means being closer to the unit than said hook portion and being engageable with the housing for holding the unit on the housing in said position where the stab connectors are engageable with the bus bars.

2. A plug-in unit for attaching to a flanged bus duct housing having an opening in one side and bus bars disposed inside the housing, said plug-in unit comprising a casing having stab connectors for insertion into said opening to engage the bus bars, mounting means secured to said casing with a pair of spaced legs extending substantially parallel to the stab connectors, a fixed hook on one only of the pair of legs for hanging the unit at any point along the flange on the bus duct housing in a disconnected position, and movable clamps on both of the legs for engaging the housing to hold the unit on the housing in its connected position with the stab connectors engaging the bus bars.

3. A plug-in unit for attaching to a flanged bus duct housing having an opening in one side and bus bars disposed inside the housing, said plug-in unit comprising a casing having stab connectors for extending therefrom for insertion into said opening to engage the bus bars, a generally U-shaped guide member secured to said casing with fixed legs of the U extending substantially parallel to the stab connectors, a fixed hook on one leg for hanging the unit at any point along the flange on the bus duct housing in a disconnected position, spring-biased clamps on the legs for engaging the housing to hold the unit on the housing in its connected position with the stab connectors engaging the bus bars, said clamps being spaced closer to the casing than said hook, and threaded means for drawing the clamps into engagement with the housing.

4. A plug-in unit for attaching to a flanged bus duct housing having an opening in one side and bus bars disposed inside the housing, said plug-in unit comprising a casing having stab connectors extending therefrom for insertion into said opening to engage the bus bars, a generally U-shaped guide member secured to said casing with fixed legs of the U extending substantially parallel to the stab connectors, a hook on one leg for hanging the unit at any point along the flange on the bus duct housing in a disconnected position, a pivotally mounted clamp on each leg for engaging the housing to hold the unit on the housing in its connected position with the stab connectors engaging the bus bars, a spring having one end attached to the leg and the other end attached to the clamp to bias the clamp away from the housing, an integrally formed projection on each leg, said projection being a pivot point for the clamp on said leg, and means threaded into said projection for actuating said clamp about the pivot point to engage the housing.

5. A plug-in unit for attaching to a bus duct housing having an opening in one side and bus bars disposed inside the housing, said plug-in unit comprising a casing having stab connectors extending therefrom for insertion into said opening to engage the bus bars, a generally U-shaped guide member secured to said casing with the legs of the U extending substantially parallel to the stab connectors, a hook on one leg for hanging the unit on the bus duct housing in a disconnected position, a generally L-shaped clamp movably attached to each leg, a generally S-shaped spring having one end attached to the clamp and the other end attached to the leg for biasing the clamp away from the housing, and a screw for drawing the clamp into engagement with the housing.

6. A plug-in unit for attaching to a bus duct housing having an opening in one side and bus bars disposed inside the housing, said plug-in unit comprising a casing having stab connectors for insertion into said opening to engage the bus bars, guide members extending from the casing substantially parallel to the stab connectors, a generally L-shaped clamp movably attached to each guide member, a generally S-shaped spring having one end attached to the clamp and the other end attached to the guide member for biasing the clamp away from the housing, and means threaded into the guide member for drawing the clamp toward the housing.

7. A plug-in unit for attaching to a bus duct housing having an opening in one side and bus bars disposed inside the housing, said plug-in unit comprising a casing having stab connectors for extending therefrom for insertion into said opening to engage the bus bars, guide members extending from the casing substantially parallel to the stab connectors, a generally S-shaped spring having one end attached to each guide member, a generally L-shaped clamp attached to the other end of each spring and biased outwardly by the spring, and a bolt threaded into the guide member for drawing the clamp inwardly to engage the housing.

8. A plug-in unit for attaching to a bus duct housing having an opening in one side and bus bars disposed inside the housing, said plug-in unit comprising a casing having stab connectors for insertion into said opening to engage the bus bars, guide members extending from the casing substantially parallel to the stab connectors, each guide member having a hole therein and an outwardly extending projection adjacent to said hole, a generally L-shaped clamp having one leg disposed in said hole, threaded means extending through the other leg into the projection to draw the clamp inwardly to engage the housing, and spring means for biasing the clamp outwardly.

References Cited in the file of this patent

UNITED STATES PATENTS

| | | |
|---|---|---|
| 1,047,063 | Irving | Dec. 10, 1912 |
| 1,835,251 | Wetstein | Dec. 8, 1931 |
| 1,965,181 | Gerlach | July 3, 1934 |
| 2,041,675 | Frank et al. | May 19, 1936 |
| 2,310,024 | Frank et al. | Feb. 2, 1943 |
| 2,339,600 | Carlson et al. | Jan. 18, 1944 |
| 2,444,648 | Jackson et al. | July 6, 1948 |